United States Patent [19]

Weaver

[11] 3,730,103
[45] May 1, 1973

[54] CONVERTIBLE RAIL-HIGHWAY VEHICLE

[76] Inventor: George D. Weaver, Weaver Road, Myrtle Creek, Oreg. 97457

[22] Filed: June 22, 1971

[21] Appl. No.: 155,451

[52] U.S. Cl..................105/141, 104/1 A, 104/119, 104/245, 105/2 A, 105/177, 105/215 C, 280/79.2 R, 295/1
[51] Int. Cl........B61d 15/00, B61f 9/00, B62d 61/12
[58] Field of Search ..........................104/1 R, 1 A; 105/144, 177, 215 R, 215 C, 179, 2 A, 141; 280/79.2 R; 295/1

[56] References Cited

UNITED STATES PATENTS

| 3,648,621 | 3/1972 | Fleming | 104/1 R X |
|---|---|---|---|
| 3,343,495 | 9/1967 | Petrik | 104/1 A |
| 1,697,636 | 1/1929 | Dobbins | 105/144 |
| 3,225,704 | 12/1965 | Gilvar et al. | 105/215 C X |
| 3,312,544 | 4/1967 | McCready et al. | 105/177 X |
| 3,575,454 | 4/1971 | Meeker | 105/215 C X |
| 1,437,183 | 11/1922 | Johnson | 105/141 |
| 1,986,845 | 1/1935 | Napier | 105/141 |

Primary Examiner—Robert G. Sheridan
Assistant Examiner—Howard Beltran
Attorney—Buckhorn, Blore, Klarquist and Sparkman

[57] ABSTRACT

Grooved rail wheels are mounted on retractable frames slidable on posts of turntables rotatable by steering cylinders controlled by magnetic sensors tending to be centered on a rail. The turntables are mounted on carriages supporting a car frame and movable laterally of the car frame. Cylinders connected together in a closed circuit cause some of the carriages to be moved toward one side of the car frame when others of the carriages are moved toward the other side of the car frame, thus centering the car frame on the group of carriages. Outrigger pneumatic wheels may be retracted when the rail wheels are extended and may be extended when it is desired to travel away from the rail. The pneumatic wheels are mounted on retractable frames, carried by turntables which are steered in pairs by racks engaging pinions on the turntables, the racks being movable by pivotal longitudinal members pivoted near the center of the car to turn the wheels nearer the center of the car less than the wheels near the ends of the car in rotating the car. Actuating wires movable with the racks causes compensating movement of the pivots of the longitudinal members to lessen this differential turning of the wheels. Ice blocks carried by the cylinders may be urged into engagement with the ground or rails to provide stabilizing. A pendulum on the car acts to shift wind vanes on the top of the car to correct tilt to one side or the other.

13 Claims, 16 Drawing Figures

Patented May 1, 1973

GEORGE D. WEAVER
INVENTOR

BY
BUCKHORN, BLORE, KLARQUIST & SPARKMAN
ATTORNEYS

GEORGE D. WEAVER
INVENTOR

BY BUCKHORN, BLORE, KLARQUIST & SPARKMAN
ATTORNEYS

GEORGE D. WEAVER
INVENTOR

BY BUCKHORN, BLORE, KLARQUIST & SPARKMAN
ATTORNEYS

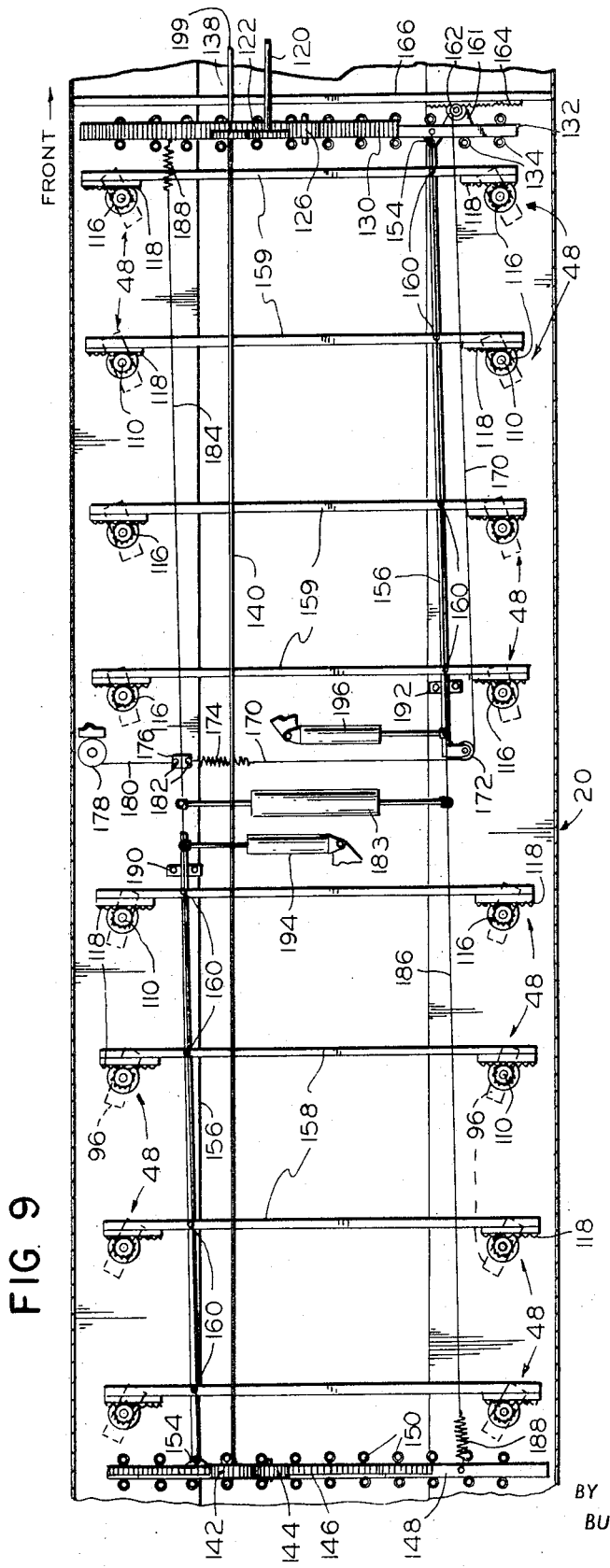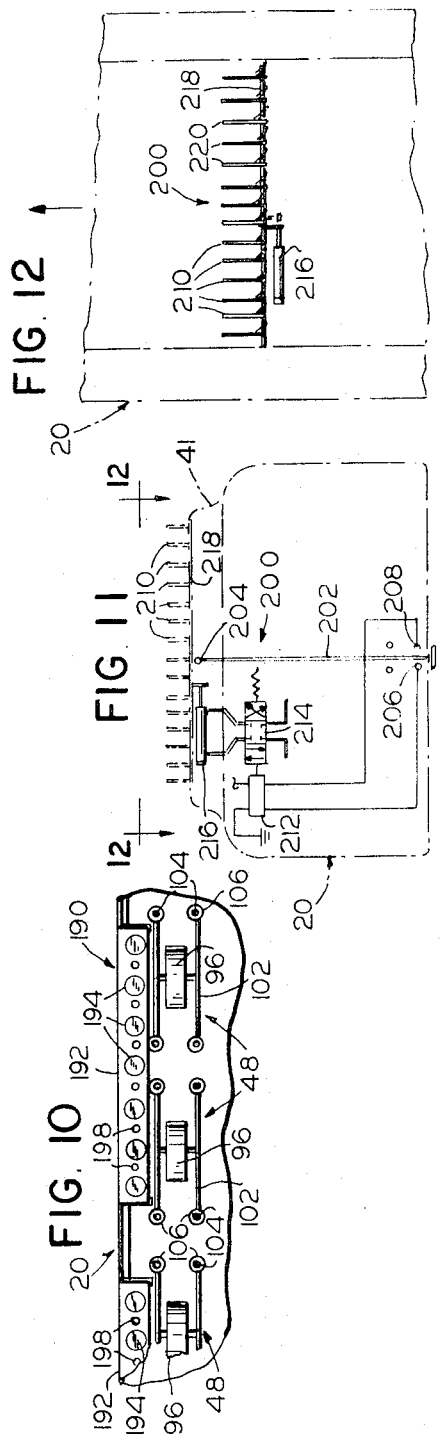

Patented May 1, 1973

GEORGE D. WEAVER
INVENTOR

BY
BUCKHORN, BLORE, KLARQUIST & SPARKMAN
ATTORNEYS

CONVERTIBLE RAIL-HIGHWAY VEHICLE

DESCRIPTION

This invention relates to high speed transportation systems, and more particularly to combined rail and non-rail high speed vehicles.

An object of the invention is to provide high speed transportation systems.

Another object of the invention is to provide combined rail and non-rail high speed vehicles.

A further object of the invention is to provide high speed monorail vehicles.

Another object of the invention is to provide a monorail vehicle having selectively operable rail wheels and ground engaging wheels.

Another object of the invention is to provide a monorail vehicle including an elongated body supported by a plurality of carriages urged toward a centered position relative to the body and including turntables carried by rail wheels, the rail wheels supporting frames vertically adjustable on the turntables by hydraulic cylinders.

Another object of the invention is to provide a high speed rail vehicle including a body carried by trucks which are shiftable laterally relative to the body and which are turned by a magnetic sensor, which is moved along the rail by the body, in a direction tending to keep the body centered over the rail. With three rails, the two outside rails have bevelled surfaces to help in the steering.

Another object of the invention is to provide a vehicle having an elongated body supported by a plurality of turnable wheels which are mounted and turned in pairs together with means for turning the pairs in the same direction, turning the front and rear wheels in opposite directions in a rotating manner such as a curved rail in altering directions in a turn or curve and for turning the pairs progressively.

Another object of the invention is to provide a high speed ground vehicle having vanes on the top thereof pendulum controlled by tilt of the vehicle to compensate for windage.

In the drawings:

FIG. 9 is a schematical plan view like FIG. 6 but with the vehicle started to turn;

FIG. 10 is a bottom plan view taken along line 10—10 of FIG. 2;

FIG. 11 is a schematic elevation view illustrating a plumb bob control for wind wings of the vehicle of FIG. 6;

FIG. 12 is a schematic plan view taken along line 12—12 of FIG. 11;

Figure 1:
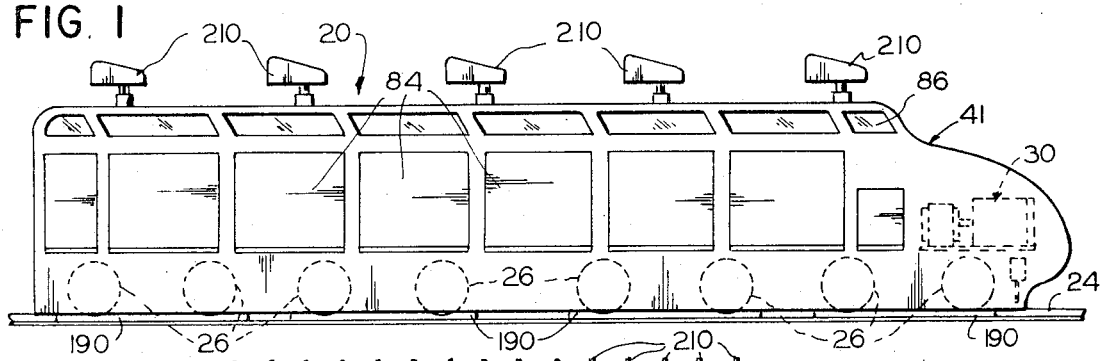
FIG. 1 is a side elevation view of a high speed transportation system forming one embodiment of the invention.
Figure 2:
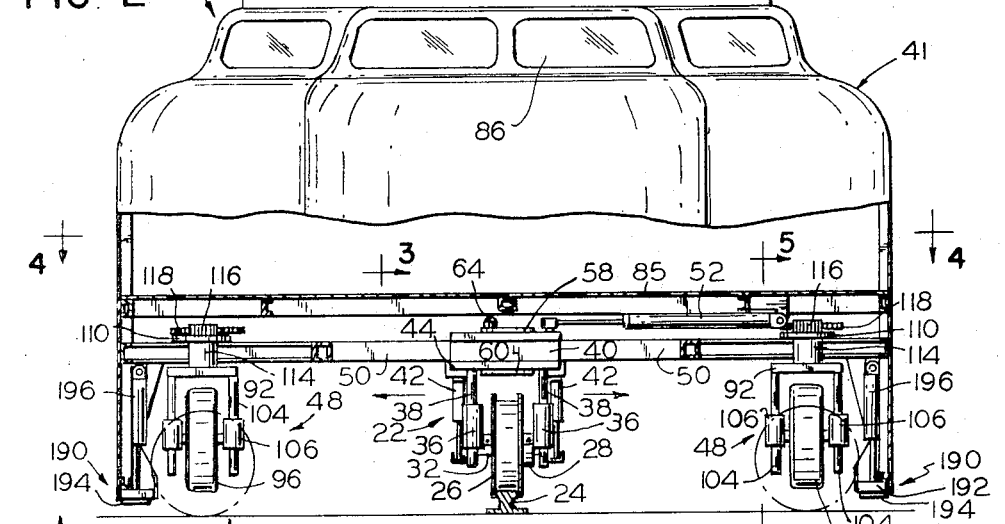
FIG. 2 is a front elevation view of the system of FIG. 1.
Figure 3:
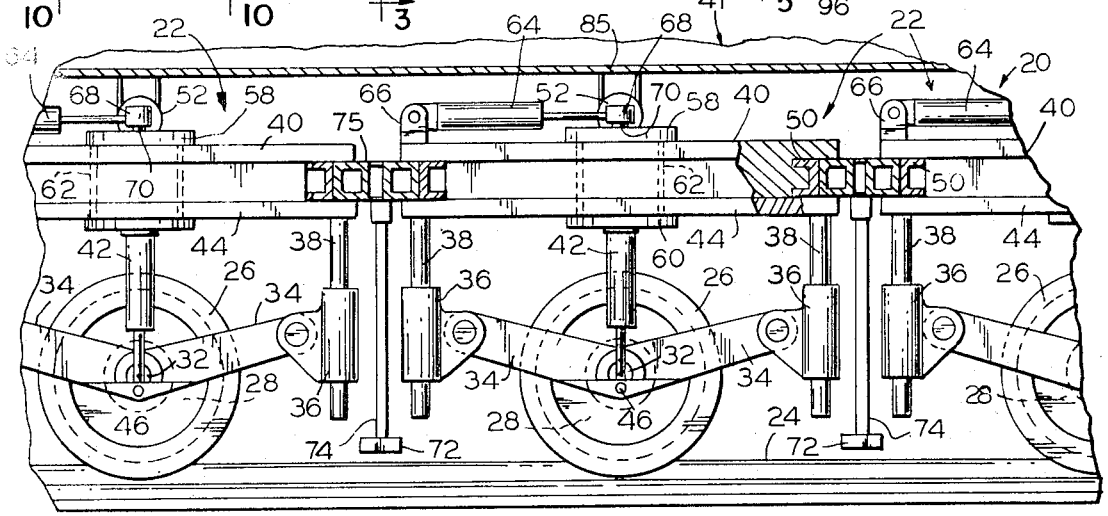
FIG. 3 is an enlarged vertical sectional view taken along line 3—3 of FIG. 2.
Figure 4:
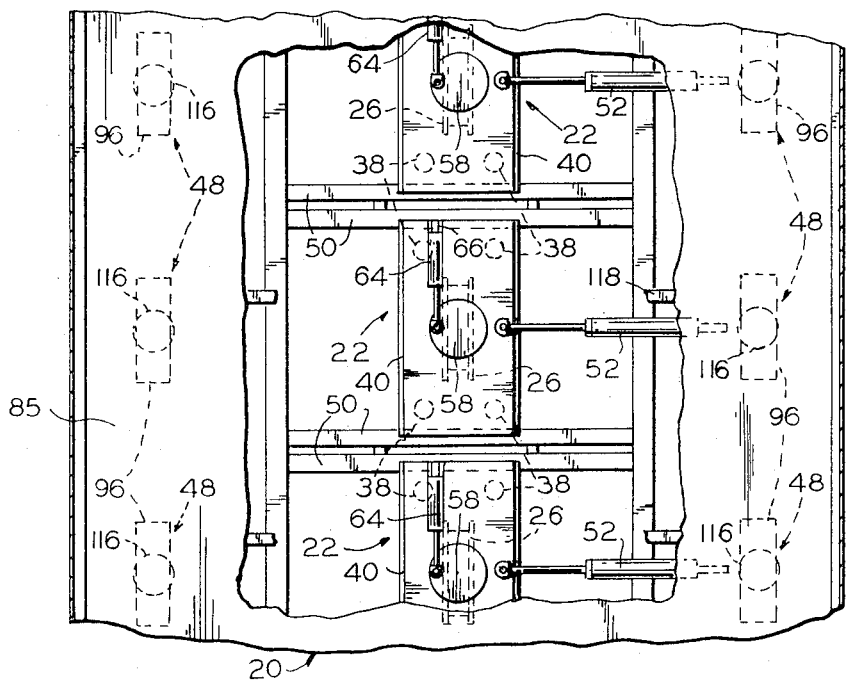
FIG. 4 is an enlarged horizontal sectional view taken along line 4—4 of FIG. 2.
Figure 5:
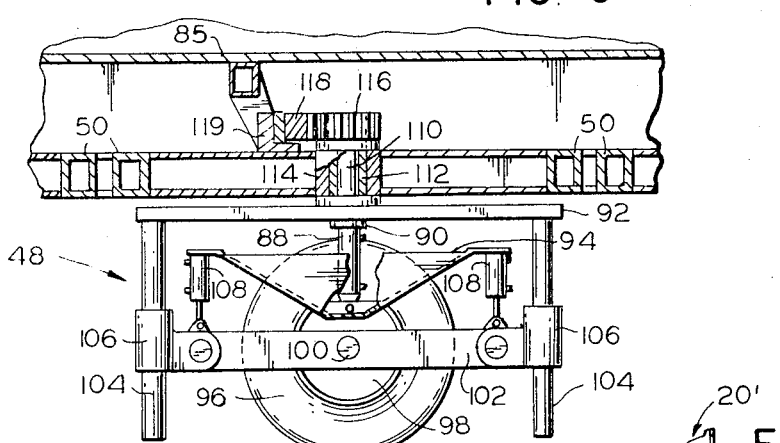
FIG. 5 is an enlarged vertical sectional view taken along 5—5 of FIG. 2.
Figure 14:
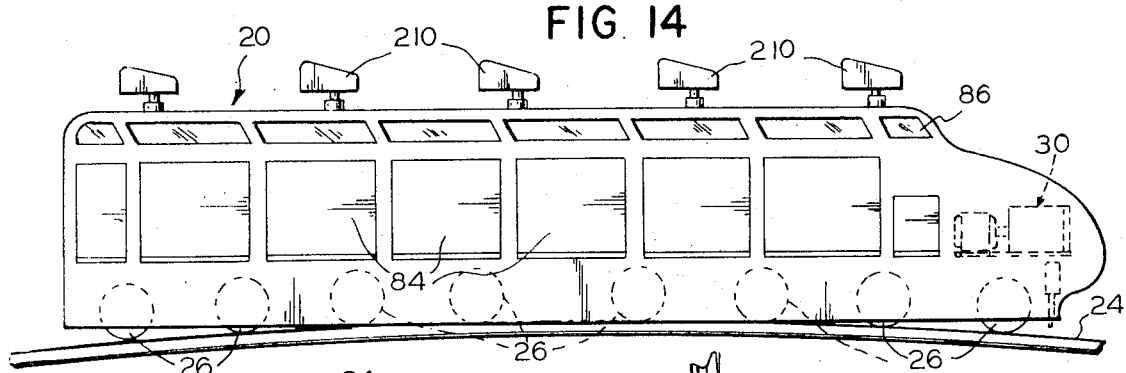
FIG. 14 is a side elevation of the system of FIG. 1 with the vehicle going over the crest of a hill with wheels of the vehicle in contact with the rail.
Figure 13:
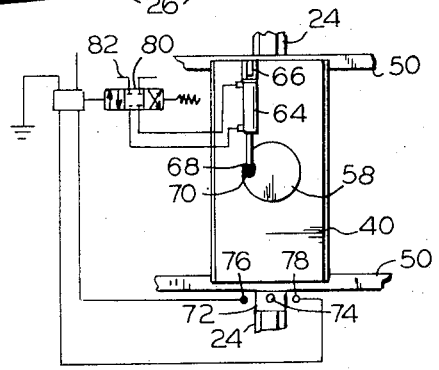
FIG. 13 is a schematical view illustrating a control circuit for rail wheel steering of the system of FIG. 1.
Figure 15:
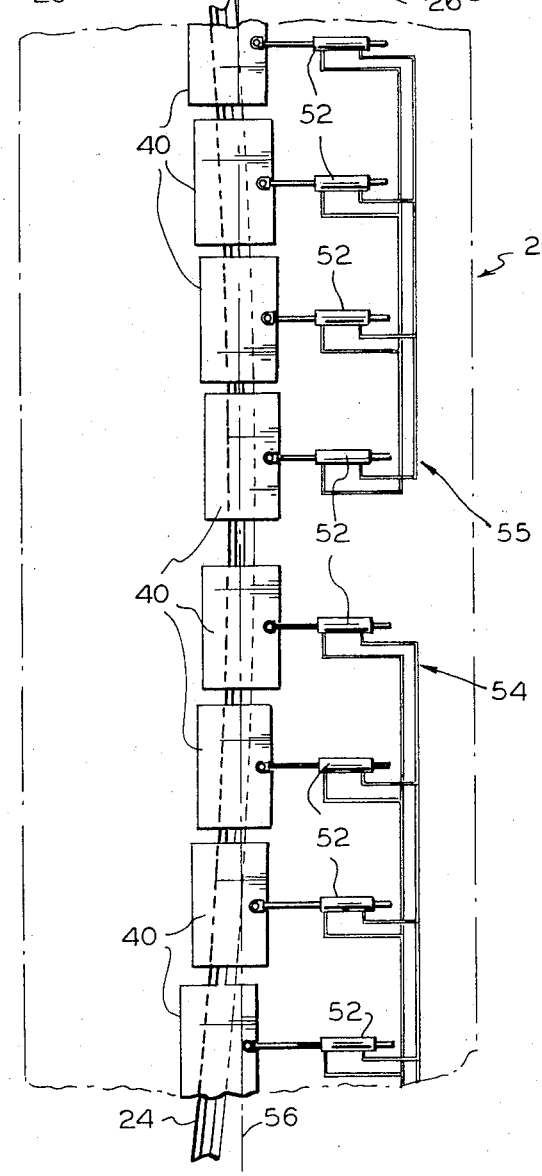
FIG. 15 is a schematic plan view of a rail wheel shifting mechanism of the system of FIG. 1.

Referring now in detail to the drawings, there is shown in FIGS. 1–15 a high speed transportation system forming one embodiment of the invention and including a monorail car or vehicle 20 designed for high speed and having a series of wheel truck assemblies 22 riding on a monorail 24. Each truck assembly 22 has a grooved or double flanged wheel 26 engaging rail 24 and a drive motor 28 (FIG. 2) whose electrical power is supplied by a diesel generator set 30 (FIG. 1). The wheels 26 (FIGS. 2 and 3) are mounted on shafts 32 which are pivotally mounted in support arms 34 which are in turn secured to tubular slides 36 guided on corner stanchions 38 attached to the bottom of carriage frames 40. Body 41 and the carriage frames 40 of the vehicle 20 are supported at a predetermined level by hoist cylinders 42 acting between the under side of carriage pivot plate 44 and a mounting pin 46 bracketed on the arm 34. As the vehicle 20 passes over the crest of a hill, as illustrated in FIG. 14, additional upward pressure is exerted on those truck assemblies 22 right at the crest and a lesser pressure is exerted on those away from the crest. Within limits, the pressures in the cylinders will equalize through a parallel piping system (not shown) supplying the cylinders with oil under pressure, so that all the wheels 20 will carry a substantially equal loading. The hoist cylinders 42 are selectively contractable to lift the ground rail wheels 26 clear of the track when it is desired to use rubber tired wheel assemblies 48 for off rail operation of the vehicle. The carriage frames 40 are slidably mounted on cross beams 50 of the body 41. The center of gravity of the vehicle is maintained as nearly directly over the rail as possible on curves in the track 24 by a series of cylinders 52 (FIG. 15) with a parallel piping system 54 interconnecting the front set of cylinders, and a parallel piping system 55 interconnecting the rear set of cylinders. As can be seen in FIG. 15, all the cylinders 52 equalize their pressures to keep center line 56 nearly directly over the rail 24. A steering mechanism is provided for each rail wheel 26 to maintain a true tracking condition on the rail 24. The hoist cylinders 42 (FIGS. 2 and 3) and the stanchions 38 are attached to the pivot plate 44 which is held onto a pivot trunnion 58 by a keeper 60. The trunnion 58 pivots within a bushing 62 forming part of the carriage frame 40. A steering cylinder 64 whose blind end is pivotably mounted at 66 on the carriage 40 has a rod end 68 secured to the top of the trunnion by a pin 70. A steering control tracking magnet 72 (FIGS. 3 and 13) is attached to a vertical post 74 laterally slidable on the center of chassis 75 of the machine. As the car 20 might drift laterally from a position directly over the rail 24, rail 24 of magnetic material holds the magnet 72 so that the magnet does not follow the car thereby closing one of the contacts 76 and 78 (FIG. 13) to actuate a solenoid operated valve 80 directing hydraulic oil from a pressure supply line 82 to either the blind end or rod end of the cylinder 64 which then steers the wheel 26 back on center of track 24. The car 20 illustrated is that of a freight carrier with loading doors 84 (FIG. 1) in the sides for access to deck 85 and a control cabin 86 up front, but it is understood that the car 20 could be outfitted for passengers as well.

At low speed operation, for stability and for off rail or ground operation, a series of rubber tired wheel assemblies 48 (FIGS. 2 and 5) are lowered into contact with the ground by cylinders 88. The base 90 of the cylinder 88 is attached to the bottom of a pivot plate 92, and the rod end is secured to a bracket 94. Tired wheel 96 and electric drive motor 98 are rotatably supported on shaft 100 in beam 102. The beam 102 is slidably mounted on guides 104 by brackets 106 and is connected to bracket 94 by air cylinders 108 which act as air springs for travel on irregular ground surface.

The wheels 48 have a steering arrangement independent from that of the rail wheel 26. This steering arrangement is best shown in FIGS. 5 to 9 wherein the pivot plate 92 is fixed to a vertical pin 110 rotatable in a bushing 112 in boss 114 forming part of the frame 75 of the car 20. A gear 116 keyed to the pin 110 is designed to be rotated by a rack 118 which is supported and guided by guide 119 of the car frame. Manual steering control means (not shown) in the cabin 86 actuates shaft 120 (FIG. 7) to rotate gear 122 in either direction as desired. The gear 122, when rotated in the direction of the arrow 124 (FIG. 7), rotates front steering drive gear 126 to rotate in the direction of the arrow 128. The gear 126 is in mesh with rack 130 fixed to a guide beam 132 between rollers 134, and the rack 130 is moved in the direction of arrow 136. At the same time, gear 122 also rotates gear 138 in the direction of arrow 139. The gear 138 is connected by a jack shaft 140 to rear drive gear 142 and rotates the gear 142. The gear 142 rotates gear 144 which moves rack 146 and guide 148 between rollers 150 in the direction of arrow 152, which is opposite to the front end arrow 136. Connected to the guide bars 132 and 148 by pivot pins 154 are beams 156, which are pivotally joined at 160 to rear cross bars 158 and front cross bars 159. The racks 118 are carried by the crossbars 158 and 159.

Connected between fixed points of the guide bars 132 and 148 are a pair of cables 184 and 186 each of which is kept stiff by a tension spring 188. While traveling straight ahead these cables are parallel to the rails 24. The moving of the guide bars 132 and 148 in opposite directions also moves opposite ends of the cables in like manner. As the cables move laterally in one direction they contact with inside terminals of switches 190 and 192 to actuate cylinders 194 and 196 causing them to contract to pivot beams 156 at 154 and turn front and rear wheels 96 in opposite directions to the positions thereof shown in FIG. 9. The switches 190 and 192 being carried by the beams 156 are moved out of contact with cables 184 and 186 to stop cylinders 194 and 196 when the wheels have been turned to the desired positions.

Also atttached to guide bar 132 is a mounting bracket 161 (FIGS. 6 and 8), which supports a pinion gear 162 engaging and revolved by a rack 164 secured to frame cross member 166. A collar 168 keyed to and rotating with the pinion 162 draws a cable 170 about a pulley 172 and shifts a switch 176 connected to cable 170 by tension spring 174. The switch 176 is connected to a spring-biased reel 178 by a cable 180 to pull slack out of the cable 170 when the guide bars 132 and 148 are reversed. As the cable 170 is drawn, it will close one of the switch contacts 182 thus causing double cylinder 183 to contract pulling the cables 184 and 186 toward each other to contact switches 190 and 192 to further actuate the cylinders 194 and 196 to contract. As can be seen by the drawings, this action increases the turning of the wheels nearest the center of the car to a greater angle to further compensate for the lesser angles through which the wheels nearest the center of the car are turned. This reduces tire skid to a minimum. The cylinders 194 and 196 move until contacts on switches 190 and 192 are opened. The cylinder 183 by retracting pulls cable 184 away from contacts 182 of switch 176 to stop further turning.

The vehicle then continues rotating until the steering mechanism is again actuated manually. The first part of the rotation of collar 168 (FIG. 8) will only pull on cable 170 a small amount, causing only a small contraction of the cylinder 183, but the farther the collar is turned, the greater the effect on the cylinder 183. The control is so designed that at the maximum rotation of collar 168, all wheels will be turned 90° to the vehicle to rotate. The switch 176 is energized only when both ends of the vehicle are being operated through the steering shaft 120. To move the vehicle obliquely or directly sidewise, the racks 126 and 146 are moved in the same direction equal distances and the double-acting cylinders are so supplied under a manual control (not shown) with fluid and exhausted as to keep the members 156 parallel to the longitudinal centerline of the car, electric current to the controls of the cylinder 183 being cut off.

In the event that only the front end of the machine is to be steered, the shaft 120 is pulled in the direction of arrow 198 (FIG. 7) to disengage gear 122 from gear 138 but still maintain engagement with longer gear 126. Then, when the shaft 120 is turned, only the front rack 130 and guide bar 132 are moved, which causes all the steering wheels 96 to turn in the same direction with their angle progressively less toward the rear of the machine with the rear set nearly straight ahead as in an automobile.

A third method of operation is provided by having gears 122 and 138 disengaged, and turning steering control shaft 120 and steering control shaft 199 independently of one another. This control would be desirable around obstruction or in minimum clearance areas. If desired, a steering system disclosed and claimed in copending application Ser. No. 155,452 filed June 22, 1971, may be used therewith.

Figure 16:
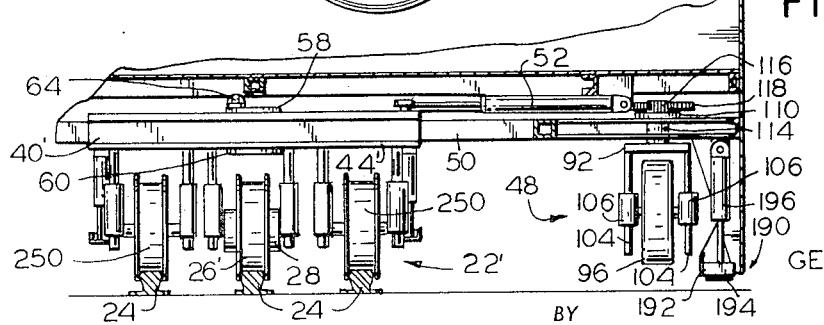
FIG. 16 is a partially sectional view of a rail vehicle forming an alternate embodiment of the invention.
Figure 6:
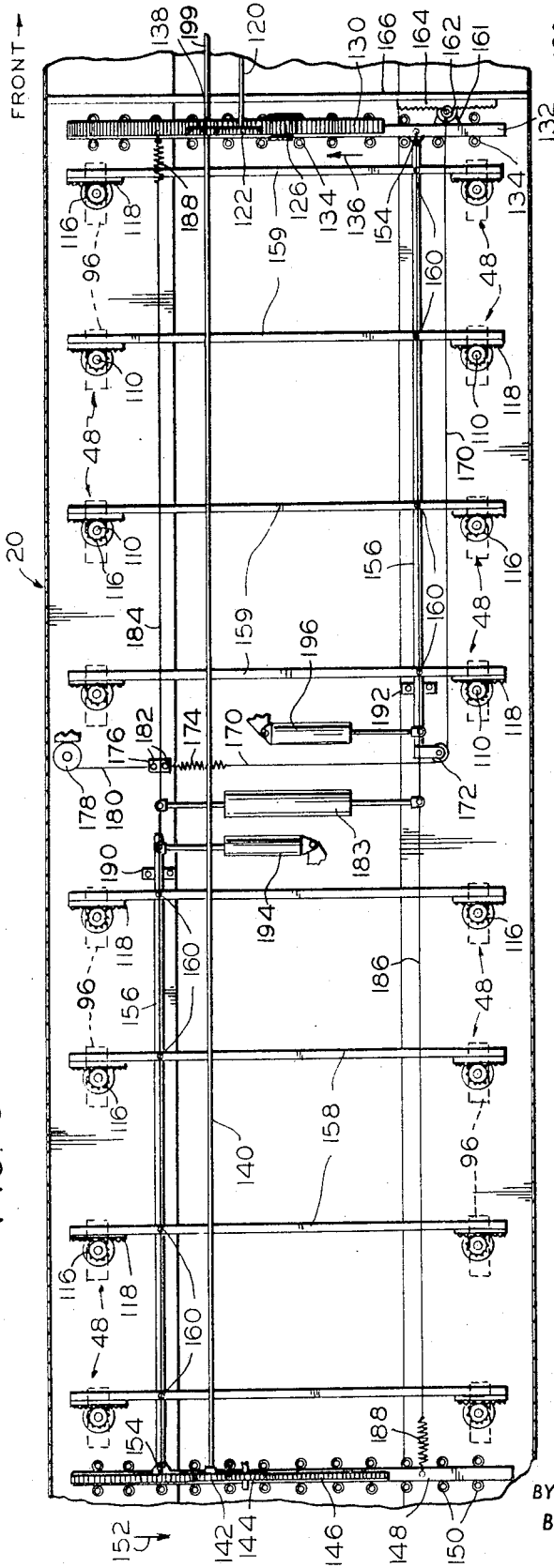
FIG. 6 is a schematic plan view of steering of outer wheels of a monorail vehicle of the system of FIG. 1.
Figure 7:
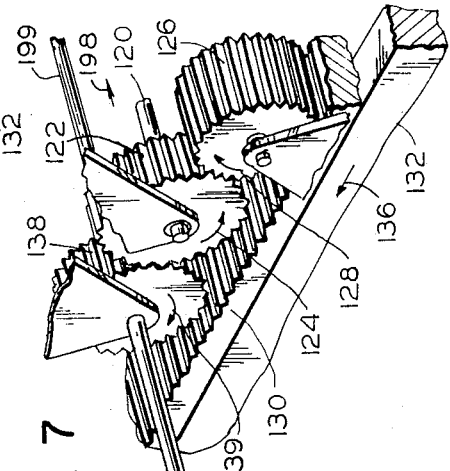
FIG. 7 is a fragmentary, perspective view of steering control gearing of the system of FIG. 1.
Figure 8:
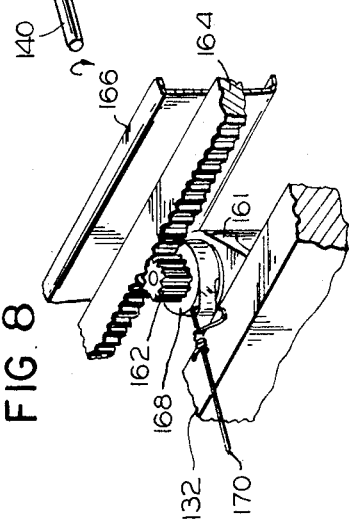
FIG. 8 is a fragmentary, perspective view of a follow up steering control of the system of FIG. 7.

FIGS. 10 and 16 illustrate an emergency stabilizing arrangement 190. A holder 192 slidable vertically on the framework of the body 41 and containing refrigeration coils (not shown) is provided with pockets holding ice discs 194 and is supported by cylinders 196 a short distance above the grade level. If the need arises, the cylinders 196 are extended bringing the ice discs 194 in contact with the ground or outer track (not shown), thereby assisting in maintaining the vehicle upright. In case the other stability system fails, an air lift jet system has downwardly directed ports 198 through the holder 192 to assist in stabilizing the car on the monorail.

A high speed stabilizing system 200 is schematically shown in FIGS. 11 and 12 with a plumb bob control 202 which is pivoted on the car body framework 41 from point 204 at its top and its lower end is positioned between a contact 206 for right-hand tilt and a contact 208 for left-hand tilt. Although only one set of contacts are shown connected, there could be a number of contacts so as to move the wind wings 210 to correct in steps. As the car 20 might tip to one side because of a side wind, or any other reason, the plumb bob 202 would contact one or more contacts 206 or 208 closing an electrical circuit in a solenoid 212 thus operating a hydraulic valve 214 supplying pressure to stabilizing cylinder 216. The cylinder is attached to a cross shaft 218 to which one end of the winds 210 are connected. The forward end 220 of the wing is fixed, but the rear end being connected to the shaft 218 is moved in one direction or the other by cylinder 216 to curve the wing to the right or left as needed. This action will cause the force of the air against the curved portion of the wing 210 to stabilize the car.

The steering controls may be calibrated for different curves so that the controls may be set for each curve. The wheels 96 have hydraulic motors as well as electric motors. The hydraulic motors provide high starting torques and the electric motors take over at higher speeds. The wheels 96 are rotated while in elevated positions, at about 5000 r.p.m. to provide a gyroscopic effect for monorail operation of the vehicle. Also, for starting monorail operation, the wheels 96 are brought into contact with the ground and bring the vehicle up to about 100 m.p.h., and then the wheels 96 are lifted out of contact with the ground and the monorail drive takes over. The hydraulic motors also may be used as a brake.

EMBODIMENT OF FIG. 16

A rail truck vehicle 20' of a high speed transportation system forming an alternate embodiment of the invention includes a rail truck assembly 22' using three wheels, one center drive wheel 26' and two stabilizing wheels 250, supported on three rails 24. Each wheel is individually bracketed to the bottom side of a steering pivot plate 44' forming part of a carriage 40'. The carriage 40' is mounted and steered like the carriage 40 described above. The center monorail wheel 26 carries 96 percent of the load, thereby eliminating side swayings. The two outer stabilizing wheels 250 have a tapered outside periphery. They have a double purpose; the main purpose is to stablilize the monorail wheel 26 so that it can run flat on a wide, flat rail 24, also to catch or prevent main vehicle from tilting when self-balancing speeds have not been reached or when stabilizing mechanisms fail.

What is claimed is:

1. In a high speed vehicle,
   a body,
   a plurality of guideways supporting the body,
   a plurality of carriages supporting the guideways and movable laterally relative to the body,
   adjustment means for adjusting the positions of the carriages laterally relative to the body,
   the adjustment means including compensating means for shifting at least one of the carriages laterally in one direction relative to the body when another of the carriages is shifted laterally in the opposite direction relative to the body to tend to keep the carriages centered as a group under the body,
   a plurality of turning mechanisms turnable on vertical axes and supported by the carriages,
   steering means for turning the turning mechanisms,
   a plurality of rail wheels,
   and a plurality of rail wheel suspension means mounting the turning mechanisms on the wheels.

2. The vehicle of claim 1 including a steel rail, magnetic sensing means on the body adapted to sense the lateral position of the body relative to the rail, and means responsive to the sensing means for actuating the adjustment means to move the carriages in a direction tending to center the body relative to the rail.

3. The vehicle of claim 1 including a freezing holder carried by the body,
   a block of ice carried by the holder,
   and means for moving the holder relative to the body between a retracted position and a position engaging a stabilizing surface.

4. The vehicle of claim 1 wherein the adjustment means comprises a plurality of cylinders and an equalizing hydraulic circuit connecting the cylinders in a closed, parallel circuit.

5. The vehicle of claim 1 wherein each of the rail wheel suspension means comprises a plurality of posts mounted on the turning mechanism, fork means mounted slidably on the posts and adjustable hydraulic cylinder means connecting the fork means to the turning mechanism.

6. The vehicle of claim 5 including equalizing hydraulic circuitry connecting the hydraulic cylinder means of the several suspension means.

7. The vehicle of claim 1 including a plurality of rail wheels mounted on each turning mechanism.

8. In a vehicle,
   an elongated body,
   a plurality of wheel mounts swiveled individually to the body and positioned in pairs spaced along the body,
   a plurality of wheels carried by the wheel mounts,
   a plurality of pinions keyed to the wheel mounts,
   a pluraliy of bars,
   a plurality of pairs of racks meshing with the pinions and fixed to opposite end portions of the bars,
   and steering means for moving the bars longitudinally to turn the wheels.

9. The vehicle of claim 8 wherein the steering means is adapted to turn the pairs of wheels differentially 10. The vehicle of claim 8 wherein the steering means is adapted to turn the wheels at the forward portion of the body in one direction and turn the wheels at the rearward portion of the body in the opposite direction.

11. The vehicle of claim 10 wherein the steering means comprises a forward rack member movable laterally of the body, a rear rack member movable laterally of the body, a front gear meshing with the front rack, a steering shaft, a steering gear on the steering shaft meshing with the front gear,
   a rear gear meshing with the rear rack,
   a second shaft keyed to the rear gear, an intermediate gear keyed to the second shaft and meshing with the steering gear, a front actuator rod connected pivotally to the front rack member and the bars at the front half of the body, and a rear actuator rod connected pivotally to the rear rack member and the bars at the rear half of the body.

12. The vehicle of claim 11 including a plurality of cylinders connecting the actuator rods pivotally to the body, and means for actuating the cylinders when the steering shaft is turned.

a body,

13. In a high speed vehicle, a body, carriages supporting the body and movable laterally relative to the body, adjustment means for adjusting the positions of the carriages laterally relative to the body, a plurality of turnable mechanisms turnable on vertical axes and supporting the carriages, steering means for turning the turnable mechanisms, a plurality of rail wheels, a plurality of rail wheel suspension means mounting the turnable mechanisms on the wheels, a plurality of ground wheels, a plurality of swivels on the body, and a plurality of ground wheel suspension means mounting the ground wheels on the swivels, each of the rail wheel suspension means being adapted to raise one of the rail wheels to a retracted position, each of the ground wheel suspension means being adapted to raise one of the ground wheels to a retracted position.

* * * * *